Figure 1:
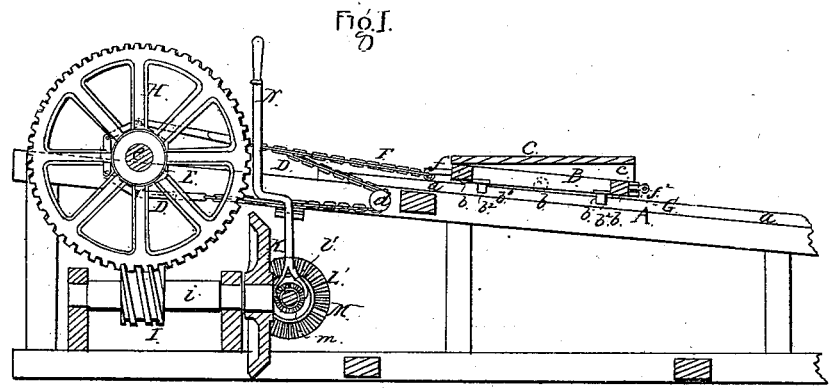

P. Emerson.
Marine Railway.

No. 93,868. Patented Aug. 17, 1869.

Witnesses:
Geo. S. Futher Jr.
Robert Burns

Inventor:
Purney Emerson

United States Patent Office.

PRIMUS EMERSON, OF CARONDELET, MISSOURI.

Letters Patent No. 93,868, dated August 17, 1869.

IMPROVED MARINE RAILWAY.

The Schedule referred to in these Letters Patent and making part of the same.

*To all whom it may concern:*

Be it known that I, PRIMUS EMERSON, of Carondelet, in the county of St. Louis, and State of Missouri, have made certain new and useful Improvements in Marine Railways; and I do hereby declare that the following is a full and true description thereof, reference being had to the accompanying drawings, and to the letters of reference marked thereon.

This invention relates to the ways and carriages, or cradles used in drawing and supporting vessels out of water for purposes of repairs to said vessels; and The nature of this invention is, first, in the arrangement and operation of the machinery for drawing the cradles out of water and moving them upon the ways; secondly, in the method of equalizing the tension of the drawing-chains or cables upon the cradles; thirdly, in the devices for guiding the cradles and supporting vessels on the same.

To enable those herein skilled to make and use my said invention, I will now more fully describe the same, referring herein to the accompanying—

Figure 2:
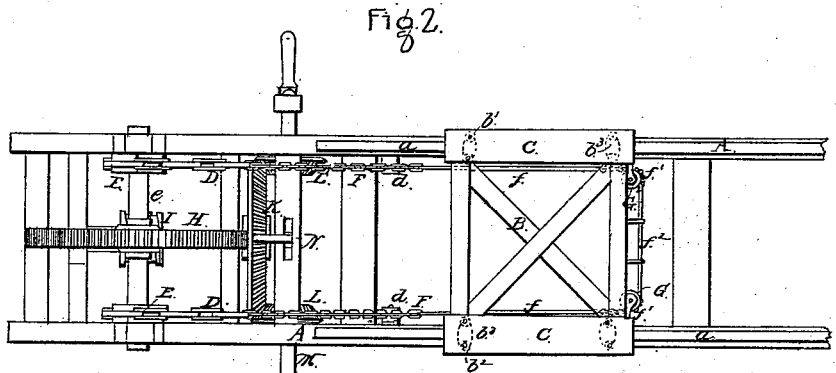
Figure 3:
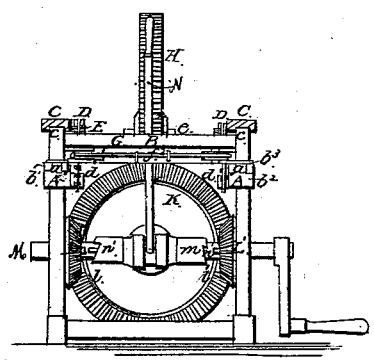

Figure 1 as a longitudinal sectional elevation; to
Figure 2 as a plan; to
Figure 3 as rear end view.

I support the ways A upon proper cross-bearers, in the manner usual. Said ways run into the water a sufficient distance, and rise up, as they extend upon the land, with a proper inclination, so that a vessel supported upon the cradles B may be drawn up on said ways, beyond the reach of the flood, and thus be repaired in the manner now usual.

The cradles B are stout frames, usually of wood, the side timbers whereof rest, by rollers $b$, upon the said ways A.

In order to guide the cradles properly in their movement, I arrange the side guide-rollers $b^1$ upon vertical spindles $b^2$, secured by proper plates $b^3$ against the cradle timbers.

The ways A have a raised tread, $a$, on the vertical sides whereof the rollers $b$ press, and are guided thus, steadying the cradle in its movement, and avoiding the friction attendant upon the use of flanged wheels and similar devices.

Upon said cradles, I arrange the slides C, there being channelled timbers resting upon the top $c$ of the cradle.

By oiling or greasing the top pieces $c$, the slides C will move and adjust themselves and the superpoised vessel, independent of the position of the cradle.

Proper stops will be attached, preventing the slides C from disconnecting themselves from the cradle. By moving the slide on one side of a cradle, an adjustment of the weight resting on the cradle itself is possible.

The vessel or other object is supported upon the slides C while being drawn from the water, and after it reaches the upper end of the ways, proper supports are added, staying the vessel as may be deemed advisable.

After repairs the support is again given upon said slides, and the cradles then are moved down to float the vessel.

In the various operations of supporting and staying vessels thus necessary, said adjustable slides C are found advantageous, and the same are especially useful to disengage the vessel readily from the cradles as she passes into the water.

The cradles B are drawn upon the ways A by endless chains D, passing over the roller $d$, and propelled by the hexagon disks E upon the shaft $e$.

The attachment of said cradles to said chains is as follows:

A draught-chain, F, connects by proper hook with the chains D. Said chains F connect with the rods $f$, at the ends whereof are chains $f^1$, passing over pulleys G, firmly secured in the rear of the cradles B.

The ends of the chains $f^1$ are joined by a bar, $f^2$, and thus the cradle is secured, and any inequality in tension at the two points of attachments of the chains F to the chains D is equalized.

The shaft $e$, before mentioned, has the screw gear-wheel H, propelled by the worm I, upon the shaft $i$. Said shaft again has the bevel-wheel K engaging with the two bevel-pinions L and L', both upon the propelling-shaft M and turning loosely thereon, unless secured by the clutch-devices now to be described.

On the shaft M, I arrange the sleeve $m$, moved by the lever N, by hand of operator. Said sleeve has a feather-connection with the shaft M, and is therefore always propelled by the shaft.

At each end of the sleeve $m$ are clutch-teeth $m'$, and in moving the sleeve by the lever N toward one or the other of said bevel-pinions L L', the clutch-teeth $m'$ engage upon proper pins $l\ l'$, respectively, upon said pinions, and thus secure the same, for the time being, to said shaft.

It is therefore apparent, that by moving the lever N to clutch one or the other pinion L or L', the gear-wheel K is rotated in one direction or in the reversed direction, as desired, and, therefore, without reversing the movement of the engine or other power rotating the shaft M, the movement of the cradles may be reversed.

Again, as each cradle is arranged with its own lever N and connecting parts, and all cradles may be operated by one shaft, M, it is nevertheless in the power of the operator, by use of the lever N, as above indicated, to move one cradle upwardly and any other cradle downwardly, if required, and thus the positions of cradles relative to each other may be adjusted.

Having thus fully described my invention,
What I claim, is—

1. The chains D, disks E, shaft $e$, screw-wheel H, and worm I, operating substantially as and for the purposes set forth.

2. The bevel-wheel K and pinions L L', operated, in combination with the power-shaft M, by a clutch-device, $m\ m'$, substantially as and for the purposes set forth.

3. The attachment of the draught-chains F to the main chains D, and their connection with the cradle, in such manner as to equalize the draught on the cradle, substantially as set forth.

4. The slides C, arranged on the cradles, substantially as and for the purpose set forth.

5. The cradles B, supported upon rollers $b$ and guided by rollers $b^1$, in combination with the draught-chains F and equalizing-sheaves G, substantially as and for the purpose set forth.

PRIMUS EMERSON.

Witnesses:
GEO. P. HERTHEL, Jr.,
WILLIAM W. HERTHEL.